United States Patent [19]
Mölls et al.

[11] B 4,013,481
[45] Mar. 22, 1977

[54] PIGMENT FORMULATION

[75] Inventors: Hans-Heinz Mölls; Karlheinz Wolf, both of Leverkusen; Reinhold Hörnle, Cologne, all of Germany; Gottfried Popp, Charleston, S.C.; Konrad Nonn, Leverkusen; Jürgen Spille, Schildgen, both of Germany

[73] Assignee: Bayer Aktiengesellschaft, Leverkusen, Germany

[22] Filed: Dec. 4, 1972

[21] Appl. No.: 311,779

[44] Published under the second Trial Voluntary Protest Program on February 10, 1976 as document No. B 311,779.

[30] Foreign Application Priority Data

Dec. 4, 1971 Germany ............... 2160208

[52] U.S. Cl. ............... 106/309; 106/288 Q
[51] Int. Cl.² ............... C09C 3/00
[58] Field of Search ............ 106/309, 308 N, 308 S, 106/308 Q, 288 Q

[56] References Cited

UNITED STATES PATENTS

| | | | |
|---|---|---|---|
| 3,042,540 | 7/1962 | Cabot | 106/308 |
| 3,252,810 | 5/1966 | Somers | 106/309 |
| 3,748,164 | 7/1973 | Akamatsu | 106/288 Q |

*Primary Examiner*—Winston A. Douglas
*Assistant Examiner*—J. V. Howard
*Attorney, Agent, or Firm*—Plumley & Tyner

[57] ABSTRACT

Process for the manufacture of pigment preparations by comminution in the presence of surface-active agents which can be saponified under acid or alkaline conditions and which contain at least one group which confers solubility in a radical which is to be split off during the saponification.

12 Claims, No Drawings

PIGMENT FORMULATION

The subject of the present invention is a process for the manufacture of strongly coloured and brilliant, pulverulent pigments.

During their manufacture, numerous pigments are initially obtained as coarsely crystalline crude products which are very weakly coloured and dull and are therefore not suitable for use as pigments.

It is already known that strongly coloured pigments can be obtained from these crude products if they are ground in the presence of salt and of the most diverse auxiliaries, such as, for example, xylene, alcohols, monoesters of glycerine and oleic acid, or chlorinated aliphatic hydrocarbons (see, for example, Moser and Thomas, Phthalocyanine Compounds, Reinhold Publishing Corp., New York, page 152 ff). This grinding with salt is a very expensive process since the grinding requires a very long time (12–18 hours) and is carried out in the presence of large amounts of salt, and the salt must subsequently again be completely eluted. Furthermore it is known that it is possible to manufacture strongly coloured pigments by dissolving the crude products in concentrated acids and precipitating the pigments in a finely crystalline form by adding water. The process has the disadvantage that only very dilute pigment solutions can be manufactured and that the removal of the acid represents a great problem.

It has also already been proposed to grind pigment dispersions in the presence of surface-active agents and/or binders, in high speed stirred mills. Whilst finely divided pigments can be manufactured in this manner, the disadvantage of this process resides in the fact that either pigments are obtained which contain surface-active agents, the surface-active behaviour of which, required during the fine division of the pigments, causes a whole series of faults in the manufacture of printing inks and lacquers, with the surface-active agents, for example, reducing the water resistance of the prints and lacquers or assisting emulsification in letterpress and off-set printing inks, or that pigments are obtained which are mixed with binders, which considerably restrict the range of uses, since only particular binders can be employed for each field of use of the pigments.

The surface-active agents employed also include the salts of long-chain organic acids, the surface-active character of which can be reduced by acidification. However, the said salts of organic acids do not adequately assist the comminution and therefore do not allow highly concentrated pigment pastes to be ground.

It has now been found that the pigments which arise during manufacture (which are generally coarsely crystalline) are converted in a simple manner, by grinding, into strongly coloured and brilliant, optionally pulverulent, pigment preparations which are free of substances which cause the abovementioned faults in the manufacture of printing inks and lacquers, if the aqueous dispersions or pastes of these pigments are ground with addition of 0.1 – 50%, relative to pigment, of surface-active agents which can be saponified under acid or alkaline conditions and which contain at least one group which confers solubility in water in a radical which is to be split off during the saponification, and after the grinding the saponification is carried out and the pigments are isolated in the usual manner, for example by filtration, washing and drying.

The surface-active agents according to the invention which are present during the grinding assist the comminution of the pigment particles and permit highly concentrated pigment pastes to be ground.

Suitable surface-active agents are, for example, partial esters of polybasic acids of the formula

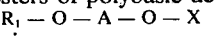

wherein
$R_1$ represents an alkyl radical with more than 6 C atoms or an alkaryl radical with more than 4 C atoms in the alkyl group, which is free of groups which confer solubility in water, A represents a polyvalent radical of a polybasic acid such as, for example, $-SO_2-$, $-PO(OH)-$, $-PO(OR)-$, $-SO_2B-SO_2-$, $-SO_2-B-CO-$, and $-CO-B-CO-$, in which
B denotes a lower alkylene or arylene radical which can optionally be substituted, especially by further carboxyl, ester or sulpho groups and X represents H or the radical of a cation, preferred cations being those of the alkali metals and ammonium.

By the alkyl radicals, there are understood saturated and unsaturated, straight-chain and branched alkyl radicals which are optionally interrupted by heteroatoms such as N, O, P or S or substituted, for example by halogen, nitro or alkoxy, and which are free of groups which confer solubility in water, especially also those with a carbonamide or sulphonamide grouping. Equally, the alkylated aryl groups are to be understood as carbocyclic-aromatic or heterocyclic-aromatic examples of such groups, which are optionally substituted further, preferably phenyl or naphthyl groups.

Suitable surface-active agents are furthermore carboxylic acid esters of the general formula

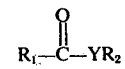

wherein
Y represents O or NH,
$R_1$ has the abovementioned meaning and
$R_2$ represents $-(CH_2)_n-SO_3X$ or $-(CH_2-CH_2-O)_mH$ or
$-CH_2-CH_2-N(CH_2-CH_2OH)_2$ wherein
$n$ denotes an integer from 2 – 4,
$m$ denotes an integer $> 3$ and
X has the abovementioned meaning.

Esters of the general formula

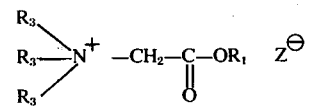

in which
the $R_3$ are identical or different and represent H, aryl, lower aralkyl and lower alkyl,
Z represents an anion and
$R_1$ has the abovementioned meaning.

Preferred embodiments contain halide, sulphate or methosulphate as the anion.

Formamidinium salts of the formula

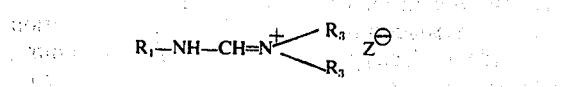

wherein
$R_1$, $R_3 + Z$ have the abovementioned meaning.
Bisulphite adducts of the formula

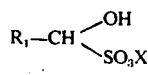

in which
$R_1 + X$ have the abovementioned meaning.

Examples of preferred surface-active agents are the sulphuric acid half-ester of coconut fatty alcohol, succinic acid mono-(2-ethylhexyl)-ester, sulphosuccinic acid di-(2-ethylhexyl)-ester, 4-sulphophthalic acid di-(2-ethylhexylester, sulphuric acid mono-($\beta$-undecylsulphonylamino)-ethyl ester, lauric acid $\beta$-sulphoethyl ester, oleic acid $\beta$-sulphoethyl ester, oleic acid polyglycol ester with 8 ethylene oxide, dimethylbenzylammonium-acetic acid hexadecyl ester and N-hexadecyl-N'-dimethylamidinium methosulphate.

It is a joint feature of all the surface-active agents that they are saponified in aqueous solution or suspension by means of dilute acids, such as, for example, hydrochloric acid, sulphuric acid or acetic acid, or dilute alkalis, such as, for example, sodium hydroxide solution or ammonia, if necessary by prolonged heating, and that thereby long-chain alcohols, carboxylic acids or amines are produced, if necessary after acidification or rendering alkaline, which no longer possess a group conferring solubility in water. The advantage of the process thus resides in the fact that pigment preparations which can also be incorporated into lacquers and printing inks without causing the faults mentioned above are obtained in a simple manner. Suitable mills are, in particular, high speed stirred mills, for example those described in Farbe and Lack 71, page 377 ff.(1965) and Farbe and Lack 75, page 953 ff. (1969) and in DAS (German Published Specification) No. 1,230,657. Stirred mills with circumferential speeds of 5–60 m/second, preferably 10–20 m/second, which contain grist of size about 0.1–10 mm, preferably 0.3–1.2 mm, of steel, glass, ceramic, sand or plastic, but preferably glass balls of diameter 0.3–1.2 mm, are best suitable for the process. In most cases it is advantageous if, before grinding in the stirred mill, the pigment dispersion is precomminuted in a colloid mill. In detail, the process is carried out by stirring the dry or water-moist crude products into water with the addition of about 0.1–50%, relative to the crude products, of a surface-active agent, to give a 5–50% strength, preferably 10–30% strength, dispersion, pre-comminuting the mixture in a colloid mill and subsequently grinding it in the stirred ball mill to an average particle size of $<1\mu$ After removing the grist, the surface-active agents are saponified in the abovementioned manner and the finely crystalline pigment is filtered off, washed and dried.

It is possible to use in the process all pigments which during manufacture are obtained in a weakly coloured and dull form, for example because of their coarsely crystalline structure, and which become more strongly coloured and more brilliant by reduction of the particle size.

The dyestuffs can belong to the most diverse classes, for example organic dyestuffs of the azo, anthraquinone, azaporphine, thioindigo or polycyclic series, and also to the quinacridone, dioxiazine, naphthalenetetracarboxylic or perylenetetracarboxylic acid series. A large number of such pigment dyestuffs is known, for example, from the Colour Index, 2nd edition.

Further, dyestuff lakes, such as Ca, Mg or Al lakes, of azo dyestuffs containing sulphonic acid groups and/or carboxylic acid groups should be mentioned.

Examples of suitable inorganic pigments are white pigments such as titanium dioxide pigments, zinc oxide, zinc white, lithopones (see Ulmanns Enzyklopaedie der techn. Chemie (Ulmanns Encyclopaedia of Industrial Chemistry), 1962, volume 13, page 750 – 772) and coloured pigments of the alkaline earth, zinc, cadmium, ultramarine, copper, lead, chromium, iron or antimony group (see ulmanns Enzyklopaedie der Techn. Chemie (Ulmanns Encyclopaedia of Industrial Chemistry), 1962, volume 13, page 7744 – 802) or carbon black.

EXAMPLE 1

30 kg of crude copper phthalocyanine ($\beta$-modification) of particle size approx. 10 – 80 $\mu$, which were manufactured according to known processes from phthalic anhydride, urea and copper salts, are stirred with 3 kg of the sodium salt of coconut alcohol monosulphuric acid ester and 67 l of water. The pigment dispersion is pre-comminuted in a corundum disc mill and is subsequently ground in a high speed stirred ball mill corresponding to German Patent No. 1,230,657. The stirred ball mill consists of a cylindrical grinding vessel of height 100 cm and diameter 26 cm (internal dimensions) and contains, as the mixing device, a shaft provided with plane circular discs which rotate at a speed of 1,000 revolutions per minute. The discs have a diameter of 21 cm and are 1 cm thick. The disc nearest to the inlet orifice is 5 cm clear of the bottom, the disc nearest the outlet lies at the level of the lower edge of the sieve, and between these a further 9 discs are mounted so that the discs aer equidistant from one another. The 4 cm high sieve is of 0.2 mm mesh width. As grist, the mill contains 67 kg of glass balls of diameter 0.3 – 0.4 mm. The pigment dispersion is pumped through the mill 4 – 5 times until the average particle size of the pigment is less than 1$\mu$. Thereafter the pigment dispersion is adjusted to a pH value of 1 – 2 by addition of 30% strength hydrochloric acid and is heated to 80° – 90°C for 6 – 7 hours, in the course of which the sulphuric acid ester of the coconut fatty alcohol is saponified. Thereafter the pigment is filtered off, washed until neutral and dried at 50°– 60°C. A blue pigment which is strongly coloured and brilliant in lacquers is obtained.

EXAMPLE 2

The following crude pigments can be employed in place of the crude copper phthalocyanine, as in Example 1: perylenetetracarboxylic acid diimide, perylenetetracarboxylic acid dimethylimide, perylenetetracarboxylic acid di-p-anisidide, perylenetetracarboxylic acid diphenetidide and dimethylquinacridone.

In the examples which follow, % denotes per cent by weight.

EXAMPLE 3

An aqueous pigment dispersion consisting of 17% of crude copper phthalocyanine (β-modification) of particle size approx. 10 – 80μ and 1.7% of an oleic acid polyglycol ester of the formula

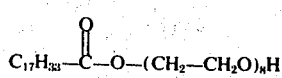

is ground as in Example 1. After grinding, the finely divided pigment dispersion is diluted with water, adjusted to a pH value of 10 – 11 with sodium hydroxide solution and heated to 80° – 90°C for 4 – 6 hours. Thereafter the mixture is acidified with hydrochloric acid and the pigment is filtered off, washed until neutral and dried at 50° – 60°C. A strongly coloured and brilliant blue pigment is obtained.

EXAMPLE 4

Like in Example 3, a strongly coloured blue pigment is manufactured from an aqueous pigment dispersion which contains 20% crude copper phthalocyanine blue (β- modification) of particle size approx. 10 – 80μ and 2% of sodium oleic acid oxyethanesulphonate

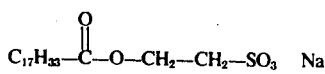

EXAMPLE 5

An aqueous pigment dispersion consisting of 16% crude copper phthalocyanine (β- modification) of particle size 10 – 80μ and 1.6% of a surface-active agent of the formula

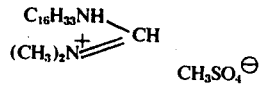

is ground as indicated in Example 1. Thereafter the finely divided pigment dispersion is adjusted to pH 9 – 10 with sodium hydroxide solution and heated to 80° – 90°C for 2 hours, and the pigment is filtered off, washed until neutral and dried.

EXAMPLE 6

An aqueous pigment dispersion consisting of 18% crude copper phthalocyanine blue (β- modification) of particle size approx. 10 – 80μ and 1.8% of a surface-active agent of the formula

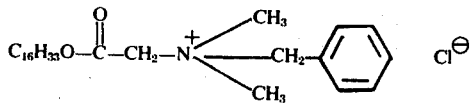

is used to manufacture a strongly coloured blue pigment as in Example 5.

We claim:

1. In the process of comminution of aqueous pigment dispersions or pigment pastes in the presence of a surface active agent; the improvement comprising utilizing as said surface-active agent in an amount of 0.1 to 50% relative to pigment, a surface-active agent which is saponifiable under acidic or alkaline conditions; following comminution, saponifying said surface active agent under acidic or alkaline conditions; and removing saponification products having solubility in water; the resulting pigment being free of surface-active agent.

2. The process of claim 1 wherein comminution is conducted on a mixture consisting of said pigment, water and said surface-active agent.

3. The process of claim 1 in which saponification is conducted under alkaline conditions.

4. Process according to claim 1, characterised in that the surface-active agents used are carboxylic acid esters of the general formula

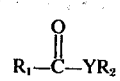

wherein
$R_1$ represents an alkyl radical with more than 6 C atoms or an alkaryl radical with more than 4 C atoms in the alkyl group, which is free of groups conferring solubility in water,
Y represents O or NH and
$R_2$ represents $—(CH_2)_n—SO_3X$ or $—(CH_2—CH_2—O)_m—H$ or $—CH_2—CH_2—N(CH_2—CH_2OH)_2$
wherein
$n$ denotes an integer from 2 – 4,
$m$ denotes an integer >3 and
X represents H or the radical of a cation.

5. Process according to claim 1, characterised in that the surface-active agents used are carboxylic acid esters of the general formula

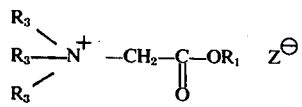

in which
the $R_3$ are identical or different and represent H, aryl, lower aralkyl and lower alkyl,
Z represents an anion and
$R_1$ represents an alkyl radical with more than 6 C atoms or an alkaryl radical with more than 4 C atoms in the alkyl group, which is free of groups conferring solubility in water.

6. Process according to claim 1, characterised in that the surface-active agents used are formamidium salts of the formula

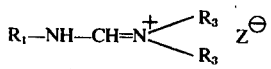

wherein
the $R_3$ are identical or different and represent H, aryl, lower aralkyl and lower alkyl,
$R_1$ represents an alkyl radical with more than 6 C atoms or an alkaryl radical with more than 4 C atoms in the alkyl group, which is free of groups conferring solubility in water and
Z represents an anion.

7. Process according to claim 1, characterised in that the surface-active agents used are bisulphite adducts of the formula

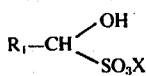

in which
R₁ represents an alkyl radical with more than 6 C atoms or an alkaryl radical with more than 4 C atoms in the alkyl group, which is free of groups conferring solubility in water and
X represents H or the radical of a cation.

8. The process of claim 1 in which said surface-active agent is a partial ester of a polybasic acid; acid has the formula

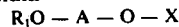

wherein $R_1$ is an alkyl radical with more than 6 C atoms or an alkaryl radical with more than 4 C atoms in the alkyl group, and $R_1$ is free of groups conferring solubility in water;
A is the radical of a polybasic acid; and
X is H or a cation.

9. The process of claim 8 in which A is $-SO_2-$, $-PO(OH)-$, $-PO(OR)-$, $-SO_2-B-SO_2-$, $-SO_2-B-CO-$ or $-CO-B-CO-$; and
B is a lower alkylene or arylene radical, optionally substituted by carboxyl, ester or sulphonic acid groups.

10. The process of claim 1 in which a pigment dispersion of 5–50% in water is comminuted.

11. The process of claim 1 in which a pigment dispersion of 10–30% pigment in water is comminuted.

12. The product produced by the process of claim 1.

* * * * *